United States Patent [19]
Fujiwara

[11] 3,780,986
[45] Dec. 25, 1973

[54] BALL VALVE

[76] Inventor: Katsuji Fujiwara, 191, Nishitani, Hiraaka-cho, Kakogawa-shi, Hyogo-ken, Japan

[22] Filed: Apr. 12, 1972

[21] Appl. No.: 243,354

[30] Foreign Application Priority Data
Apr. 28, 1971 Japan.................................. 46/34234

[52] U.S. Cl................................. 251/315, 251/164
[51] Int. Cl............................................. F16k 5/06
[58] Field of Search................... 251/309, 315, 316, 251/159, 164

[56] References Cited
UNITED STATES PATENTS

| | | |
|---|---|---|
| 3,037,738 | 6/1962 | Jackson et al.................. 251/315 X |
| 3,421,733 | 1/1969 | Stewart, Jr...................... 251/316 X |
| 3,288,430 | 11/1966 | Priese .................................. 251/315 |
| 3,411,746 | 11/1968 | Scaramucci......................... 251/315 |
| 3,458,172 | 7/1969 | Burrows.......................... 251/315 X |
| 3,154,094 | 10/1964 | Bredtschneider et al....... 251/315 X |
| 3,323,542 | 6/1967 | Magos et al. ................... 251/315 X |

*Primary Examiner*—Samuel Scott
*Attorney*—David Toren et al.

[57] ABSTRACT

A ball valve includes a main body having an axially extending passageway within which a valve body is positioned. Within the passageway, the opposite sides of the valve body are fitted against valve seat members. One valve seat member is secured by a valve seat retainer which is adjustably secured within the passageway by a corrugated washer and an adjusting member in threaded engagement with the main body, the other valve seat is held by a projection on the main body which extends radially inwardly into the passageway. Extending annularly about the radially outer surfaces of each valve seat member is an annular groove which accommodates any heat expansion of the valve seat members. At each end of the passageway, an end member is clamped to the main body, one end member forms an inlet port and the other forms an outlet port. The ball valve can be easily disassembled for inspection purposes and its simple arrangement makes it easy to manipulate and maintain.

6 Claims, 3 Drawing Figures

PATENTED DEC 25 1973 3,780,986
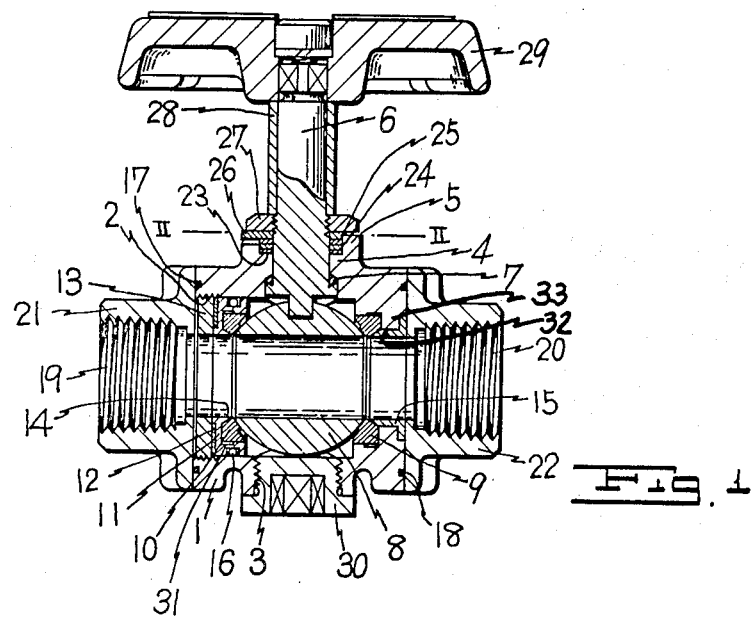
Fig. 1
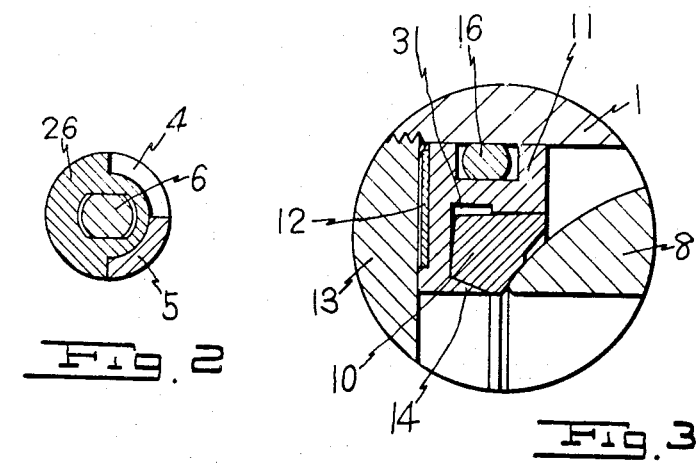
Fig. 2
Fig. 3

BALL VALVE

BACKGROUND OF THE INVENTION

In conventional ball valves, the main body of the valve is divided into two parts so that the valve body can be inserted into the valve. Within the main body two valve seats, formed of a plastic material such as Teflon, are spaced apart and located on the opposite sides of the valve body. The two parts of the main body are secured together by bolts, clamps and the like and press the valve seats against the valve body.

In such known arrangements, the air-tight construction of the ball valve is satisfactory at the outset of its use, however, due to the clamping action acting on the valve body which is larger than necessary, the torque needed to open and close the valve is very large.

Further, when the ball valve described above is used in a steam line, both of the valve seats will undergo plastic flow and project into the passageway through the valve. Due to the plastic flow experienced, the air-tight construction of the valve will be reduced and when the valve is opened and closed, the portions of the valve seats which have undergone plastic flow, will be squeezed by the valve body with the result that it becomes impossible to rotate the valve body. When such plastic flow occurs, in order to reuse the valve, it is necessary to remove the ball valve and to tighten the valve seats, or, alternatively, to disassemble the ball valve and replace the valve seats. Therefore, the useful lifetime of such ball valves is relatively short and their maintenance is considerable.

To provide an improved air-tight construction for such ball valves, an arrangement has been used in which the valve seats are pressed against the valve body by springs. However, in such a valve arrangement, when the fluid pressure within the valve increases, the fluid leaks and it is difficult to maintain a perfect air-tight seal.

SUMMARY OF THE INVENTION

The present invention is directed to a ball valve construction and, more particularly, it concerns an arrangement including an adjusting member for holding the valve seats securely against the valve body.

In accordance with the present invention, a one piece main body forming a passageway holds a valve body between two valve seats. One of the valve seats is held in place by a retainer while the other valve seat is positioned against a projection extending inwardly from the inner surface of the main body. An adjusting member is threaded into the main body and presses against a corrugated washer which in turn presses against the valve seat retainer for effecting a tight sealing action between the valve seats and the valve body. Further, an O-ring is provided between the valve seat retainer and the inner surface of the main body to provide a sealing action. At each end of the passageway through the main body, an end member is clamped to the main body with one end member forming an inlet port and the other an outlet port for the valve.

The primary object of the present invention is to afford a ball valve construction which can be easily assembled and disassembled and to provide an air-tight seal within the valve which can be easily adjusted. Due to the construction of the ball valve, its air-tight seal can be maintained for a long period of time. Further, the valve seats are held in place so that any plastic flow which takes place does not have a deleterious effect on the operation of the valve.

Another object of the invention is to provide a ball valve construction which is small in size and simple in arrangement and, further, which is easy to handle and to maintain.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

In the drawing:

FIG. 1 is a longitudinal sectional view of a ball valve constructed in accordance with the present invention;

FIG. 2 is a sectional view taken along line II—II in FIG. 1; and

FIG. 3 is an enlarged partial view of a portion of the valve illustrated in FIG. 1.

DETAILED DESCRIPTION OF THE INVENTION

In FIG. 1, a ball valve construction is shown which includes a main body 1 forming an axially extending passageway. At one end of the passageway a port 2 is formed through which a valve body 8 is inserted into the main body. Intermediate the ends of the passageway a port 3 extends through the main body and forms an opening through which a valve stem 6 can be inserted into the valve. On the opposite side of the passageway from the port 3 is a cylindrically shaped portion 4 which forms an opening into which the valve stem 6 is seated. At the upper end of the cylindrically shaped portion 4, a partly circularly shaped projection 5 is provided which is spaced raidially outwardly from the valve stem 6. On the opposite end of the passageway through the main body from the port 2 is an opening 32 and a holding portion 33 extends radially inwardly from the inner surface of the main body 1 adjacent the opening 32.

When the valve stem 6 is positioned within the cylindrically-shaped portion 4, a packing 7, formed of a plastic material, such as Teflon, is positioned between the valve stem and the adjacent surface of the main body 1.

Within the passageway through the main body 1, the valve body 8 is held between a pair of valve seats 9 and 10. One of the valve seats 9 is held in position by the holding portion 33 which projects inwardly from the inner surface of the main body 1. The other valve seat 10 is held in position by a valve seat retainer 11 positioned within the main body passageway at its port 2. Positioned against the surface of the valve seat retainer 11, spaced axially from the valve body 8, is a corrugated washer 12 and an adjusting member 13, in threaded engagement with the inner surface of the main body 1 within its port 2, presses against the corrugated washer which, in turn, presses against the valve seat retainer 11 and provides an air-tight effect between the valve body 8 and the valve seats 9, 10.

Formed in the inner surface of the main body in juxtaposition to the radially outer surface of the valve seat 9, and in the surface of the valve seat retainer 11 in juxtaposition to the radially outer surface of the valve seat 10, are shallow, annular grooves 31 which accommodate any heat expansion of the valve seats during use. The radially inner surface of the valve seat 9 is held within the passageway through the main body by a bushing 15. In a somewhat similar manner, the radially inner surface of the valve seat 10 is held by a annular projection 14 formed on the radially inner surface of the valve seat retainer 11. The construction and arrangement of the annular projection 14 and the bushing 15 prevents any plastic flow of the valve seats into the passageway within the main body and also acts to reinforce the valve seats.

Disposed within an annular groove in the radially outer surface of the valve seat retainer 11 is an O-ring 16 which bears against the inner surface of the main body and provides a sealing action therebetween. At the opposite ends of its passageway, the main body 1 is clamped between two end members 21, 22 with the end member 21 forming an inlet port and the end member 22 forming an outlet port for the valve. A packing 17, 18 is provided between each of the end members 21, 22 and the adjacent end surfaces of the main body 1.

Seated on the valve stem 6 in an annular recess formed within the cylindrically shaped portion 4 of the main body, is a corrugated washer 23 on which are superposed a washer 24, a sliding ring 25 and a stopper 26. Threaded on the valve stem 6 is a nut 27 which bears downwardly on the stopper 26 and affords an upward pulling action on the valve body. Further, a sleeve 28 laterally encloses the valve stem from the nut 27 to the upper end of the stem on which a handle 29 is fitted.

As shown in FIG. 2, the stopper 26 has a semi-circular recess formed on one side which limits the extent to which the valve stem 6 can be rotated. The arcuately shaped projection 5 on the upper end of the portion 4 is located within the semi-circular recess in the stopper and provides the limiting stop for the open and closed positions of the valve.

The port 3 is the main body of the valve, through which the valve stem 6 is inserted, is closed by a plug 30.

In the ball valve described above, the valve seat 10 on one side of the valve body 8 is held within the valve seat retainer 11 and the O-ring 16 is positioned between the valve seat retainer and the inner surface of the main body and the air-tight effect between the valve body and the two oppositely disposed valve seats 9 and 10, is attained by threading the adjusting member 13 into the main body against the corrugated washer 12.

Within the main body the valve seats 9 and 10 are held in place, one by the combination of the holding portion 33 and the bushing 15 and the other by the valve seat retainer 11 with its annular projection 14. The holding arrangement for the valve seats, along with the shallow annular grooves 31, assure that any plastic flow or displacement of the valve seats does not interfere with the proper operation of the valve body.

If the valve seats 9, 10 expand due to heat, the amount of expansion is absorbed between the corrugated washer 12 and the annular grooves 31, so that there is no plastic flow of the valve seats into the passageway through the main body.

If the fluid pressure on the side of the outlet port 20 becomes larger than the fluid pressure on the side of the inlet port 19 when the valve is closed, the fluid is prevented from flowing backwardly through the valve by means of the O-ring 16 positioned between the valve seat retainer 11 and the inner surface of the main body 1. Moreover, in this arrangement, the axial sliding motion of the valve seat retainer is small, accordingly, the valve seats 9, 10 do not tend to slip out of position and the air-tight effect within the valve is maintained.

Further, the construction of the ball valve, in accordance with the present invention, provides the elements forming the valve unit clamped between a pair of end members with packing disposed between the end surfaces of the main body of the valve and the end members for providing an adequate sealing effect.

Based on the arrangement and construction of the ball valve as described above and shown in the drawing, the assembly and disassembly of the valve can be easily performed, and, in case of maintanece, it is possible to detach principal parts as a unit without removing the entire valve from a pipeline. Further, when a part of the valve is removed it is not necessary to renew the packing and the inspection and handling of the valve can be accomplished in a simple manner.

If, due to use over an extended period, the air-tight effect within the valve decreases markedly, the original degree of air-tightness can be re-established by screwing the adjusting member 13 against the valve seat retainer to effect the desired force of the valve seats acting on the valve body. With this arrangement it is possible to obtain a ball valve having a particularly long useful lifetime.

While a specific embodiment of the invention has been shown and described in detail to illustrate the application of the invention principles, it will be understood that the invention may be embodied otherwise without departing from such principles.

What is claimed is:

1. A ball valve comprising a main body forming an axially extending passageway therethrough having a first end and a second end, a ball valve body positioned within said passageway intermediate the ends thereof with the first end having a diameter sufficient to pass said valve body into position in said passageway and said second end being smaller than said first end so that said valve body cannot pass outwardly from said passageway through said second end, a first annular-shaped valve seat member located within the first end of said passageway and in contact with said valve body and a second annular-shaped valve seat member located within the second end of said passageway and disposed in contact with the opposite side of said valve body from said first valve seat member, an annular valve seat retainer located within the first end of said passageway and arranged to receive and hold said first valve seat member in contact with said valve body, a corrugated washer in surface contact with the opposite side of said valve seat retainer from the side in contact with said first valve seat member, an adjusting member movably secured in the first end of said main body in contact with the opposite side of said corrugated washer from the side thereof in contact with said valve seat member, a sealing ring disposed between the outer circumferential periphery of said valve seat retainer and the surface of said passageway within said main body, said main body having a holding portion at its second end projecting inwardly into the passageway on the opposite side of said second valve seat member from said valve body, said valve seat retainer having an annular groove formed in a surface therein in contact with a radially outer surface of said first valve seat member, said main body having an annular groove formed in its surface in contact with a radially outer surface of said second valve seat member and located adjacent to said holding portion, and the annular grooves formed in said valve seat retainer and said main body are arranged to accommmodate expansion of said first and second valve seat members.

2. A ball valve, as set forth in claim 1, wherein said valve seat retainer forms an opening in alignment with the passageway through said main body, an annular projection formed on the radially inner surface of said valve seat retainer for supporting at least a portion of the radially inner surface of said first valve seat member, and a bushing located within the second end of the passageway in said main body adjacent the outlet port, said bushing disposed in supporting contact with a portion of the radially inner surface of said second valve seat member.

3. A ball valve, as set forth in claim 1, wherein said main body having aligned openings therein with the axis of the aligned openings disposed transversely of the axis of the passageway therethrough, a valve stem insertable into said main body through one of said aligned openings and securable within the main body within the other said aligned opening, and said valve stem disposed in engagement with said valve body.

4. A ball valve, as set forth in claim 3, wherein a plug is secured in the aligned opening in said main body through which said valve stem is inserted, said plug providing a closure for the opening.

5. A ball valve, as set forth in claim 3, wherein means positioned on said valve stem for securing it to said main body, said means including a stopper having an arcuately shaped recess along a portion of its periphery, and a similarly configured arcuately shaped projection on said main body and said projection being engageable within the recess in said stopper for limiting the movement of said valve stem and valve body between the opened and closed positions of said ball valve.

6. A ball valve, as set forth in claim 5, wherein said means on said valve stem includes a corrugated washer in contact with said main body, a washer superposed on said corrugated washer, a sliding ring superposed on said washer, said stopper superposed on said sliding ring, and a nut threaded on said valve stem and seated against said stopper.

* * * * *